Oct. 13, 1925.
F. A. ZEBOLD ET AL
1,556,890
WHEEL PULLER FOR AUTOMOBILES
Filed Jan. 8, 1923
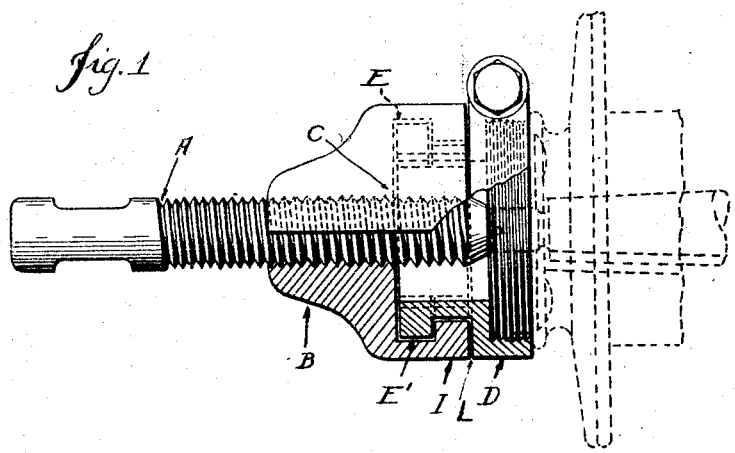
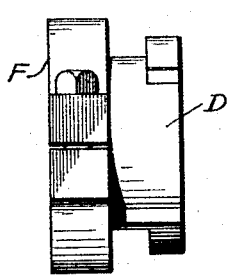
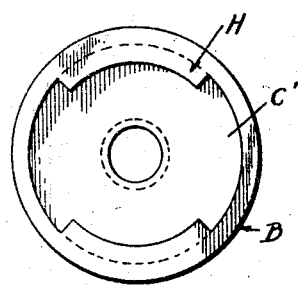
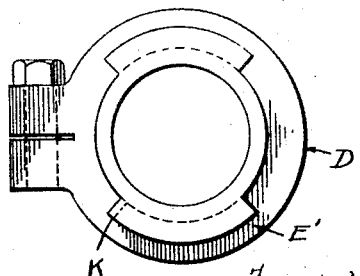
Witness:
E. K. Campbell.
C. H. Gwinn.
Inventor.
Frank A. Zebold,
James B Duncan,
Rudolph F. Fisher,
By C. D. Campbell. Atty.

Patented Oct. 13, 1925.

1,556,890

UNITED STATES PATENT OFFICE.

FRANK A. ZEBOLD, JAMES B. DUNCAN, AND RUDOLPH F. FISHER, OF BELLEFONTAINE, OHIO.

WHEEL PULLER FOR AUTOMOBILES.

Application filed January 8, 1923. Serial No. 611,487.

*To all whom it may concern:*

Be it known that we, FRANK A. ZEBOLD, JAMES B. DUNCAN, and RUDOLPH F. FISHER, citizens of the United States, and residents of Bellefontaine, in the county of Logan and State of Ohio, have invented a new and useful Improvement in Wheel Pullers for Automobiles, of which the following is a specification.

Our invention relates to certain improvements in devices for removing wheels from their axles, in automobiles and for other similar work.

Figure 1: is a side view, partly in section, of my device, in position on the hub of the wheel and against the end of the axle.

Figure 2: a cap, that is secured to the hub of the axle, after the cap or mud-guard has been taken off, and by means of flanges on the head and corresponding flanges in the cap, unite the base and cap.

Figure 3: front view of the head.

Figure 4: rear view of the cap.

In the drawings A is a screw shaft or plunger threaded on a head B and extending through its center longitudinally. C and C' are chambers or openings in the end of the base; the chamber C' having a channel E of larger diameter than the rest of the chamber. D is a cap having an opening therethrough and having flanges or lugs, E' projecting outwardly from an extension of the cap. These lugs E' interlock with corresponding inturned arcuate flanges H on the base. F is an interiorly screw threaded projection of cap D by means of which the cap is attached to the hub. K, is a lug on one of the flanges E' to prevent the flange going past the corresponding flange H when in position for work.

The operation of our device is as follows: When it is desired to remove an auto wheel, the mud cap is unscrewed and removed from the end of the hub and the threaded end of cap D screwed on to the end of the hub, where the hub-guard had been. The head B is then placed in position against the free end of the cap, so that the flanges H on the cap will be opposite the free spaces between the flanges E' on the cap and then pushed home, the flanges H passing to the side and rear of the cap flanges E', when the cap is given a quarter turn around to right interlocking flanges H, behind the flanges E' on the cap, thus securely attaching the two parts. The screw A is then run forward, the end of it in contact with the end of the axle, until the cap and wheel are pulled free from the axle. A tap with a hammer on the outer end of the screw, after the screw has been run up tight, facilitates the loosening of the hub and wheel.

By varying the diameter of the threaded portion F of the cap, the device is adaptable to other automobiles enabling a garage to use the same base and device on any machine.

As shown in the drawings, the parts B and D do not fit snugly nor tightly together, but a small space is left between them, as shown at "L", which allows of a limited endwise movement of the part D within the chamber or recess in head B. This space is quite limited and is provided for the purpose of facilitating the starting and removal of the wheel from the axle. In operation, when the inner end of the screw is run up taut against the end of the axle the further turning of the screw is facilitated or assisted, by tapping on the outer end of the screw shaft with a hammer. These strokes, against the outer end of the screw shaft, add to the efficiency of the screw power by jarring the shaft and wheel, and accelerating their separation, making the withdrawal of the wheel from the axle speedier and less difficult. As is well known, the wheels of automobiles are driven on their axles by great power and become almost immovably attached thereto, and if they have become at all rusted, as they will, it is very difficult to remove them from the axle. It is very commonly done by striking the end of the axle with a sledge, to the detriment of the axle, and often to the wheel.

What we claim is:

The combination in a device for removing automobile wheels, a carrying head comprising a chambered base having inturned arcuate flanges spaced apart and providing a channel in back of the same, a cap having an opening therethrough and having outwardly extending spaced flanges adapted to be passed between the arcuate flanges and into the channel and interlock with said arcuate flanges with a slight endwise free space between them, said cap having an interiorly threaded projection opposite the flanged portion and adapted to engage the threaded portion of the wheel hub, one of said outwardly extending flanges being provided with a stop lug to contact the flange on the base and limit the movement of the latter, and a thrust screw working through said head and cap and adapted to exert pressure on the wheel shaft.

FRANK A. ZEBOLD.
JAMES B. DUNCAN.
RUDOLPH F. FISHER.